United States Patent
Walrand et al.

(10) Patent No.: US 7,046,665 B1
(45) Date of Patent: May 16, 2006

(54) PROVISIONAL IP-AWARE VIRTUAL PATHS OVER NETWORKS

(75) Inventors: Jean Walrand, Berkeley, CA (US); Ayman Fawaz, Berkeley, CA (US); Rajarshi Gupta, Berkeley, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 0 days.

(21) Appl. No.: 09/427,215

(22) Filed: Oct. 26, 1999

(51) Int. Cl.
*H04L 12/56* (2006.01)
*H04J 14/00* (2006.01)
*H04J 3/16* (2006.01)

(52) U.S. Cl. ............... 370/392; 370/395.4; 370/395.5; 370/469; 398/48; 398/68

(58) Field of Classification Search ............ 370/395.5, 370/395.52, 395.53, 400–401, 412, 428, 370/465–466, 469, 351, 352, 355; 398/48, 398/68, 79
See application file for complete search history.

(56) References Cited

U.S. PATENT DOCUMENTS

| | | | |
|---|---|---|---|
| 5,313,454 A | 5/1994 | Bustini et al. ............. 370/13 |
| 5,361,255 A | 11/1994 | Diaz et al. ............. 370/58.1 |
| 5,440,549 A | 8/1995 | Min et al. ............. 370/60 |
| 5,485,455 A | 1/1996 | Dobbins et al. ............. 370/60 |
| 5,491,694 A | 2/1996 | Oliver et al. ............. 370/85.4 |
| 5,499,238 A * | 3/1996 | Shon ............. 370/399 |
| 5,519,698 A | 5/1996 | Lyles et al. ............. 370/60 |
| 5,526,352 A | 6/1996 | Min et al. ............. 370/60 |
| 5,623,356 A * | 4/1997 | Kaminow et al. ............. 398/46 |
| 5,675,576 A | 10/1997 | Kalampoukas et al. ..... 370/232 |
| 5,734,486 A | 3/1998 | Guillemot et al. ........... 359/139 |
| 5,742,772 A | 4/1998 | Sreenan ................ 395/200.56 |
| 5,790,546 A | 8/1998 | Dobbins et al. ............ 370/400 |
| 5,822,319 A * | 10/1998 | Nagami et al. ............. 370/392 |

(Continued)

FOREIGN PATENT DOCUMENTS

WO  WO 200062575 A1 * 10/2000

OTHER PUBLICATIONS

Manchester J et al: "IP Over SONET" IEEE Comunications Magazine, US, IEEE Service Center. Piscataway, N.J., vol. 36, No. 5, May 1, 1998, pp. 136-142, XP000752858, ISSN: 0163-6804.*

*Primary Examiner*—Chau Nguyen
*Assistant Examiner*—Tri H Phan
(74) *Attorney, Agent, or Firm*—Blakely, Sokoloff, Taylor & Zafman LLP

(57) ABSTRACT

In accordance with the invention, a system and method for providing QoS to packets formatted in accordance with one protocol (e.g., IP or Ethernet) carried over networks that are originally designed to be used with another protocol (e.g., ATM, WDM, or TDM). In one embodiment of the invention, such a switch is modified in order to allow the switch to become "IP-aware." Such a modified switch can identify IP packets, determine if any packets should be dropped, classify the packets with a queue, and schedule the packets of each queue in a manner that provides quality of service to the packets in the queue. Moreover, some embodiments of a modified switch further include a monitor to keep statistics on the packets in the modified switch, a protection mechanism that monitors fault information for at least part of the network, and a provisioning mechanism that determines normal and backup paths for each connection.

5 Claims, 9 Drawing Sheets

U.S. PATENT DOCUMENTS

| | | | |
|---|---|---|---|
| 5,920,705 A * | 7/1999 | Lyon et al. | 709/240 |
| 5,987,022 A * | 11/1999 | Geiger et al. | 370/349 |
| 6,021,263 A * | 2/2000 | Kujoory et al. | 709/232 |
| 6,028,842 A * | 2/2000 | Chapman et al. | 370/235 |
| 6,078,953 A * | 6/2000 | Vaid et al. | 709/223 |
| 6,081,507 A * | 6/2000 | Chao et al. | 370/235 |
| 6,104,700 A * | 8/2000 | Haddock et al. | 370/235 |
| 6,115,373 A * | 9/2000 | Lea | 370/355 |
| 6,151,299 A * | 11/2000 | Lyon et al. | 370/229 |
| 6,252,848 B1 * | 6/2001 | Skirmont | 370/229 |
| 6,259,699 B1 * | 7/2001 | Opalka et al. | 370/398 |
| 6,271,946 B1 * | 8/2001 | Chang et al. | 398/79 |
| 6,288,811 B1 * | 9/2001 | Jiang et al. | 398/79 |
| 6,385,171 B1 * | 5/2002 | Takase et al. | 370/235 |
| 6,434,153 B1 * | 8/2002 | Yazaki et al. | 370/395.21 |
| 6,463,068 B1 * | 10/2002 | Lin et al. | 370/414 |
| 6,473,425 B1 * | 10/2002 | Bellaton et al. | 370/392 |
| 6,532,088 B1 * | 3/2003 | Dantu et al. | 398/43 |
| 6,567,378 B1 * | 5/2003 | Yuan et al. | 370/235 |
| 6,587,469 B1 * | 7/2003 | Bragg | 370/401 |
| 6,611,522 B1 * | 8/2003 | Zheng et al. | 370/395.21 |
| 6,614,790 B1 * | 9/2003 | Veres et al. | 370/395.2 |
| 6,654,374 B1 * | 11/2003 | Fawaz et al. | 370/394 |
| 6,674,750 B1 * | 1/2004 | Castellano | 370/354 |
| 6,674,760 B1 * | 1/2004 | Walrand et al. | 370/411 |
| 6,721,325 B1 * | 4/2004 | Duckering et al. | 370/395.4 |
| 6,804,776 B1 * | 10/2004 | Lothberg et al. | 713/160 |

* cited by examiner

TIME-DIVISION MULTIPLEXING (TDM)

STATISTICAL MULTIPLEXING - FIRST COME, FIRST SERVED

PROVISIONAL IP-AWARE VIRTUAL PATHS OVER NETWORKS

FIELD OF THE INVENTION

The present invention relates generally to data networks and, more particularly to provisioning of reliable data transport services with guaranteed quality of service (QoS).

BACKGROUND

In communications technology, there is an ever-increasing demand for high-performance networks, and in particular, a demand for high-performance Internet access. This increased demand has led to the development of improved networks capable of handling larger volumes of data with smaller delays. Nonetheless, as the applications of data transmission mature, the need for quality of service in a network is becoming apparent. "Quality of Service" (QoS) generally refers to guaranteed bounds on the delay, loss rate, available throughput, and/or other measures of reliability. Yet, many of the networks available today do not provide QoS or they provide inadequate QoS for many applications.

Communications networks like the Internet are generally formed with a number of transmission links interconnected with switches. A transmission link is any medium through which signals are communicated and can be single or multiple twisted pairs, optical fiber, coaxial cable, radio links, or other mediums. A switch is a device with one or more input ports and one or more output ports. The switch directs (routes) bits arriving at an input port to the appropriate output port. The bit stream carried by a particular link is often referred to as the "bandwidth" of the link, although this term is technically a misnomer.

The bandwidth of a link is typically shared by multiple data streams and is divided up according to one of several methodologies. For instance, Time Division Multiplexing (TDM) divides bandwidth among multiple data streams by allocating each data stream a time slot. More specifically, using TDM the respective data streams are transmitted for a designated time period in a round robin fashion over a shared transmission link. Referring to the illustration of FIG. 1, to multiplex Z data streams using TDM, the first stream is transmitted for T(1) seconds, then the second stream for T(2) seconds, and so on until the Z-th stream is transmitted for T(Z) seconds. The cycle then repeats starting again with the first stream. Hence, each data stream gets a fraction of the total transmission rate for the shared link, i.e., the stream i (i=1, . . . , Z) gets a fraction $$\frac{T(i)}{[T(1)+T(2)+\ldots+T(Z)]}$$

of the transmission rate of the link.

In TDM, prior to allocating data to a time slot (sometimes referred to as a "channel"), a periodic framing structure is imposed on the incoming raw bit stream. Bits in the frames are used to monitor bit transmission and to synchronize receivers. One protocol that uses TDM is SONET (synchronous optical network), which further synchronizes the framed data to a common clock. Other TDM protocols, SONET-Light and "digital signal hierarchy" (DS-0, DS-1, etc.), do not synchronize the framed data with a common clock.

Despite the ability to send multiple data streams through a shared link at a guaranteed rate for each data stream, when a particular data stream does not need its time slot on the link, that fraction of the link capacity is wasted because other data streams are not permitted to use that time slot. Thus, when a particular data stream is not utilizing its allocated bandwidth, the link lays idle for the stream's time slot—unavailable for use by any other data stream, leading to an inefficient utilization of available resources.

Similar to TDM is wave division multiplexing (WDM). WDM is often used with optical fibers. Each data stream is assigned a wavelength. Multiple wavelengths can be combined for transmission in a single fiber.

An alternative to TDM and WDM is packetizing. The incoming raw data stream is divided into packets and then the packets are scheduled for transmission on a link according to a scheduling method such as statistical multiplexing. Division into packets also requires imposing a framing structure on the raw bit stream. Unlike the framing structure in TDM, however, the framing structure is not periodic. Successive packets can carry a fixed or variable number of bits, and each packet contains an identifier to enable a receiver to determine how the packet is to be handled. Some packets also include an error-detection field to enable a receiver to determine if the transmission was error-free. Examples of protocols that use these types of packets are IP (Internet Protocol), Frame Relay, Ethernet, PPP (Point-to-Point Protocol), and ATM (asynchronous transfer mode).

Once divided into packets, the packets need to be scheduled for transmission on a link, often using a statistical multiplexing (SM) method. In contrast with TDM, SM does not allocate fixed periodic fractions of the transmission rate of the link to the different data streams. Instead, an SM method schedules packets for transmission depending on the actual needs of the different data streams. In its simplest form, illustrated in FIG. 2, statistical multiplexing schedules packets on the transmission line in the order of their arrival at the switch, i.e., on a first come, first served basis. Although such a scheduling method does not waste communication resources, it cannot guarantee a minimum transmission rate for any particular data stream. There is no predetermined delay for a packet to get to its destination. Other SM methods are known in the art and can provide some minimum transmission rate, but usually there is still the possibility that delivery of a message will be delayed. Therefore, most data communication service providers, although they utilize statistical multiplexing for packet transmission, will not guarantee any minimum quality of service.

Data multiplexed into the links, using TDM, WDM, SM, or other method, is transmitted from source to destination using one of three strategies: circuit switching, datagram (or packet) switching, and virtual circuits.

Circuit switching entails establishing an end-to-end connection to handle the transmission rate of a given data stream before any data is communicated. Hence, in a circuit-switched network, a bit stream flows along a fixed, pre-established sequence of links at a constant rate. Circuit switching is frequently used in combination with TDM in SONET networks and in Digital Signal Hierarchy networks that make up telephone networks. When a user places a telephone call, a signaling protocol enables switches to exchange call control information in order to establish and configure a suitable path.

A datagram network, such as an IP network, utilizes packets as described above. Each packet includes an identification of its destination address. Switches, referred to as "routers" in this technology, maintain tables that indicate the next link for each possible destination address. To maintain these routing tables, the routers regularly exchange information. Nonetheless, each packet is routed individually, and each packet from a particular data stream will not necessarily follow the same path to its destination as other packets from the same stream.

A virtual circuit network, such as ATM, also routes packets, which are called "cells", as in a datagram network, but it pre-determines a path for the cells to take. Each cell is labeled with a virtual circuit identifier, and every switch maintains a table that specifies the next link for every possible virtual circuit identifier. While virtual circuits can be permanently established, frequently they are "switched." When they are switched, a suitable path must be determined whenever a new connection is requested. Once a virtual circuit is established, all of the cells for that virtual circuit follow the same route along the virtual channel, thereby guaranteeing the order of cell arrival. Further, because data is sent in cells, these cells can be statistically multiplexed, and can use all available resources efficiently while guaranteeing a minimum quality of service.

Some networks essentially combine different switching strategies. For instance, MPLS (multiprotocol label switching) is a virtual circuit-like mechanism for IP networks. In MPLS, a virtual circuit-like identifier is added to IP packets. The routers then use that MPLS identifier to determine the next link for the packet as well as a scheduling rule. Thus, in IP networks, some routers base their routing decisions on the packet's destination address while others use an MPLS identifier.

Despite the availability of numerous protocols mentioned above, most networking experts agree that by 2005 at least 95% of the telecommunication traffic will consist of IP packets that are generated by voice, multimedia, and traditional data applications. Much of this growth is due to the recent explosion in Internet usage and applications. Yet, these IP packets will not just be transported over datagram networks designed to manage them—these IP packets will also be transported over virtual circuit networks, such as ATM, as well as circuit-switched networks utilizing TDM protocols, e.g., SONET. While these networks can reliably transport IP packets, they cannot guarantee any QoS to the IP packets themselves. For instance, while ATM can guarantee QoS to the cells it transports, it cannot provide QoS to the IP packets that arrive at its switches and that are subdivided into cells. Often, only fragments of packets will be transported in an ATM network, while the remainder of the packet is discarded. These ATM networks, as well as TDM networks, are simply not equipped to provide QoS to IP packets. Yet demand for QoS for IP transported over all networks (regardless of protocol) is expected to grow substantially.

SUMMARY

In accordance with the invention, a system and method for providing QoS to packets formatted in accordance with one protocol (e.g., IP or Ethernet) carried over networks that are originally designed to be used with another protocol (e.g., ATM, TDM, or WDM) is disclosed. In one embodiment of the invention, such a switch is modified in order to allow the switch to become "IP-aware."

More specifically, in one embodiment, a pre-existing switch, that may be designed to carry ATM or TDM formatted data, is modified to include the following. A packet identifier is included that allows the modified switch to identify packets and to selectively drop packets that are formatted in accordance with a protocol that is generally different from that the switch was originally designed for (e.g., IP or Ethernet packets). Also included is a classifier, which classifies the packets with a queue number in the modified switch in accordance with information contained in the header of the packet. A modified switch further includes a scheduler that schedules the packets for transmission in a manner that provides a selected quality of service to the packets of each queue.

Some embodiments of the invention further include a monitor to keep statistics of the packets in the modified switch, a protection mechanism that monitors fault information for at least part of the network, and a provisioning mechanism that determines normal and backup paths for each connection.

BRIEF DESCRIPTION OF THE DRAWINGS

The present invention is described with respect to particular exemplary embodiments thereof and reference is accordingly made to the drawings in which.

DETAILED DESCRIPTION

A system and method for providing QoS to packets formatted in accordance with one protocol carried over networks that traditionally do not guarantee QoS to packets of that particular protocol is disclosed. For instance, with an embodiment of the invention, QoS can be provided to IP packets transported over ATM networks. Another embodiment provides QoS to IP packets carried over a TDM network (e.g., SONET, Digital Signal Hierarchy). Still, other embodiments provide QoS to IP packets carried over Frame Relay, IP, or other networks. Other embodiments can provide similar services for Ethernet packets or even for other packet types over networks that do not guarantee QoS for those types of packets. Thus, although IP packets are used as exemplary throughout this document, the invention is not intended to be limited to IP packets.

Figure 4:
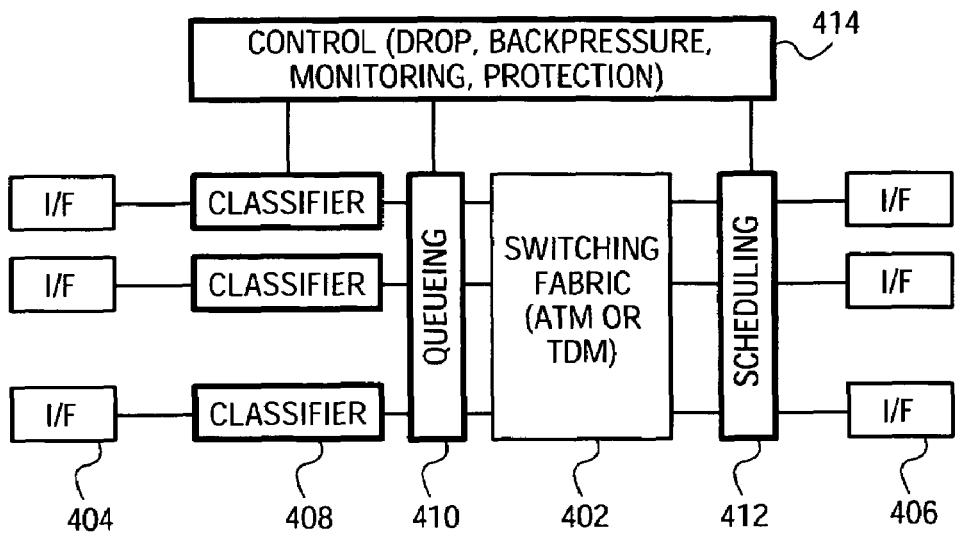
FIG. 4 is a function block diagram of a switch in accordance with an embodiment of the invention.

FIG. 4, illustrates a modified switch 400 in accordance with an embodiment of the invention. Modified switch 400 is, in one embodiment, a modified ATM switch, TDM switch, or other conventional switch. As shown, node 400 utilizes the basic switching fabric 402 as well as the input/ output ports and interfaces 406 that are all found in a conventional switch, such as an ATM or TDM switch. A "switching fabric" is essentially a device that carries bits/packets from its input ports to the appropriate output port, but is not itself involved in scheduling. In addition, in accordance with an embodiment of the invention, the following elements have been added, which elements are shaded in FIG. 4: one or more classifiers 408, queuing logic 410, scheduler 412, and control unit 414. Some of these elements may replace analogous elements in a conventional switch, e.g., the scheduler. Each of these elements can be implemented in hardware, software, firmware, or a combination thereof.

Because "switching fabric" 402 is the main part of a conventional switch (e.g., ATM or TDM), "switching fabric" 402 will frequently be referred to as a "switch" or "conventional switch." For clarity, the device of FIG. 4, will generally be referred to as a "modified switch." Nonetheless, it is to be understood that while in some embodiments a pre-existing "conventional switch" will be modified, in other embodiments a "modified switch" will be originally built to resemble FIG. 4, where nothing is actually "modified."

Generally, the elements of FIG. 4 perform the following roles. As packets arrive through a port and interface 404, classifier 408 evaluates the packets and determines which queue those packets should join. Queuing module 410 identifies the packets and determines whether packets should be sent or discarded. Switch 402, places packets into an appropriate queue. The scheduler 412 determines which packets should be sent next. The control module 414 supervises and aids each of these elements. The roles each of these elements play will be discussed in further detail below.

IP-Awareness

In order to provide QoS for IP packets to switches that are not traditionally designed for use with the IP protocol or with IP packets, a modified switch needs to be made aware that it is carrying IP packets and what type of IP packets—in other words, the IP packets must be identified. Although some embodiments of the invention will reassemble packets, in one embodiment of the invention implemented over ATM links this identification can be done without reassembling the IP packets. Typically, when ATM links transport IP packets, an IP packet is sent as a string of consecutive ATM cells. The cell header of the last cell of the packet is identified with a special bit. When an ATM cell is received that is identified as the last cell in an IP packet, then a modified switch 400 in accordance with the invention recognizes that the next cell to arrive will contain the IP header of the next IP packet. An IP packet header can also be easily identified in TDM-based switches, since TDM simply adds a framing structure around an entire packet.

As well as locating IP headers, the control module 414 can keep track of the number of IP packets in the modified switch and various queues in the modified switch. The module 414 can then perform calculations with respect to the IP packets as if the IP packets were not fragmented into cells. Using the results of these calculations, the queuing module can determine if the IP packet should be dropped, which is discussed below.

Once the IP packet header has been located, the IP packet type is determined. In particular, IP packets are of generally two types: UDP (User Datagram Protocol) and TCP (Transmission Control Protocol). Each protocol has different characteristics.

For instance, UDP is an "open-loop" transport protocol. It generally does not use feedback to pace its transmissions. In a typical application, a source places a bit stream into UDP packets, which are encapsulated into IP packets. These IP packets are transmitted by the source as they become available. The source may add a time stamp and a sequence number to enable the receiver device to play back the bit stream correctly and to adjust for packet losses.

TCP is a "closed-loop" transport protocol that adjusts the pacing of its transmissions to the level of congestion that it notices in the network. When a destination receives packets, the destination sends an acknowledgment packet to the source. The source detects congestion when it fails to receive acknowledgments of transmitted packets within a reasonable time. When it detects congestion, the source slows down its transmissions. Otherwise, when acknowledgments are being timely received, the source speeds up its transmissions with a rate of increase that is inversely proportional to the round trip time of the connection. The round trip time is the time it takes until the source gets an acknowledgment after sending a packet.

If a number of UDP and TCP connections share a buffer in a router, as the TCP connections increase their transmission rate, they will eventually saturate the buffer and force the router to drop packets, including UDP packets. When the TCP connections detect the losses, they will slow down transmissions, but they will eventually speed up again. Further, the TCP connections with a shorter round-trip time speed up faster than the other connections, enabling these short connections to monopolize most of the available bandwidth of the router. The consequences of these interactions are that the TCP connections often induce undesirable losses of UDP packets, and the TCP connections with a shorter round-trip time get most of the router bandwidth.

Figure 5:
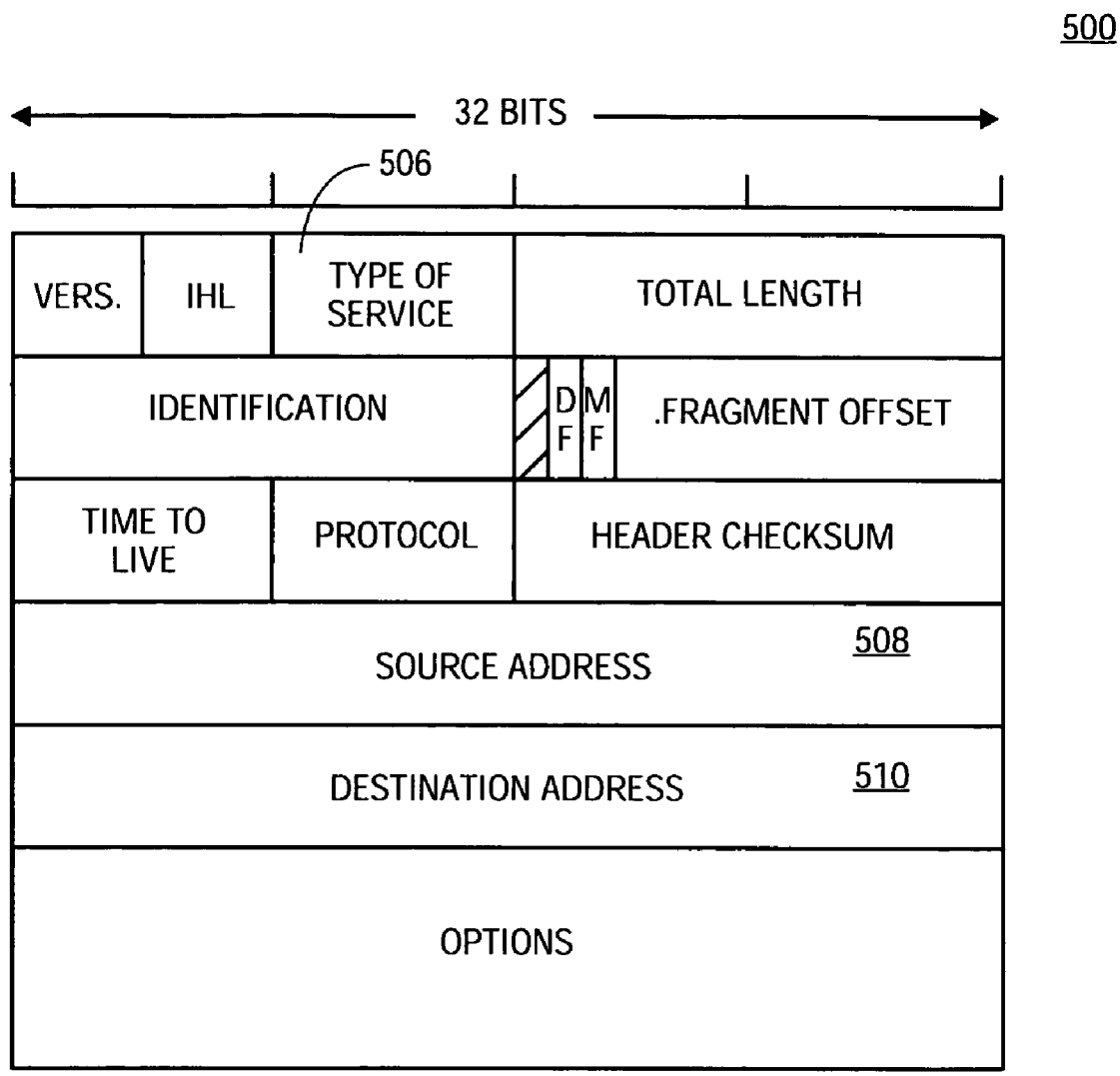
FIG. 5 is a block diagram of an IP header.

Thus, the ability to identify these types of packets as UDP or TCP is important in order to be able to fully provide QoS to IP packets. A UDP or TCP header is usually inserted in a packet immediately following an IP header. So once the IP header is located, the packet can be evaluated to determine if the packet type is UDP or TCP. An illustration of an IP header is shown in FIG. 5. IP headers as well as UDP and TCP headers are well-known in the art and will not be described in detail here.

The Drop Decision

In order to minimize congestion and to distribute resources among different data streams, packets are selectively dropped from a modified switch in accordance with an embodiment of the invention. Once the type of IP packet is determined, then a determination as to whether to discard the packet can be made. In an embodiment, this decision will be made by the queuing module 410, based upon information received from control module 414. If the packet is a UDP packet, then the packet is not dropped unless the switch buffer is full. If the packet is a TCP packet, then discard decisions will be made based upon the numbers of packets that have previously arrived at the modified switch. To make these discard decisions, several methods that are currently used in traditional IP switches for determining whether or not a packet should be dropped are used in a modified switch 400 in accordance with an embodiment of the invention.

One method for selectively dropping packets is "Random Early Drop" (RED). In RED, packets are dropped with a probability that depends upon the recent average queue length for a queue of packets in the modified switch. In one embodiment of the invention, the average queue length $q_{av}$ is first computed according to the identity $q_{av} = \alpha q_{av} + (1-\alpha)q$, and where $\alpha = 7/8$ in many embodiments of the invention for ease of division. A drop probability p is then set to zero if $q_{av}$ is less than a low threshold value L. The drop probability p is set to 1 if $q_{av}$ is greater than a high threshold value H. In one embodiment, L and H are set to 15 and 50, respectively. When p=0, no packets will be dropped. When p is set to 1, all packets for that particular queue will be dropped. But, if $q_{av}$ falls between L and H (L<$q_{av}$, <H), then p=0.2($q_{av}$–L)/(H–L). $q_{av}$ will vary slowly even when the queue receives bursts of data, but as $q_{av}$ gets closer to H, more and more drops will be made. In some embodiments of the invention, drop probability p is replaced with $$\frac{p}{(1-\beta k)}$$

where p is determined as described above, k is equal to the number of packets admitted since the last drop, and β is tunable but in one embodiment is set to 2%.

Another method of determining when to drop packets is referred to as Weighted RED (WRED), a variation of RED that provides a form of differentiated services in a single queue. In other words, if there are multiple classes of packets for a single queue, drops are made per class. For example, if there are X classes in a particular queue, when a packet of class x arrives, RED applies to that packet based on the recent average number of packets for that class and on thresholds L and H chosen for that particular class. Thus, each class is treated distinctly.

Still another method for determining when to drop packets is referred to as Explicit Congestion Notification (ECN). ECN is similar to RED, except that ECN marks packets (e.g., in the IP header) instead of dropping them as RED would. Once these marked packets reach their destination, the destination echoes the marks in the acknowledgments it sends back to the source. When the source receives these marked acknowledgments, the source reacts by slowing down its transmission rate, similar to its reaction to dropped packets. ECN is thus advantageous over RED in that the source can slow down without having to experience losses of packets that it must then re-transmit.

An alternative to RED or ECN, is policing, designed to throttle traffic of connections to avoid overwhelming other connections. One mechanism for policing IP packets uses a leaky bucket methodology similar to that used by ATM as will be understood by those of skill in the art. With leaky bucket policing, if the switch gets full faster than it can output packets or if the switch receives packets faster than a specified rate, then the switch will discard packets.

Tracking of the IP packets by control module 414 also allows the modified switch to drop entire IP packets as opposed to fragmented packets. In contrast, in ATM, once the ATM switch reaches a threshold level of cells, the ATM switch will start to drop cells using a leaky bucket algorithm, but these cells may only form a portion of an entire IP packet. When only portions of IP packets are dropped and the rest transmitted, the transmitted portions of the IP packets needlessly waste bandwidth since these fragmented packets cannot be used at the destination and must be re-transmitted anyway.

Classification

As shown in FIG. 4, one or more classifiers 408 are part of a modified switch 400 in an embodiment of the invention. Classification is important in order to separate data streams and to provide QoS to each data stream. A system and method describing classification is found in METHOD AND SYSTEM FOR IMPLEMENTING END-TO-END QoS IN PACKET-SWITCHED NETWORKS, Ser. No. 09/407,205, filed Sep. 28, 1999, incorporated by reference.

Figure 6:
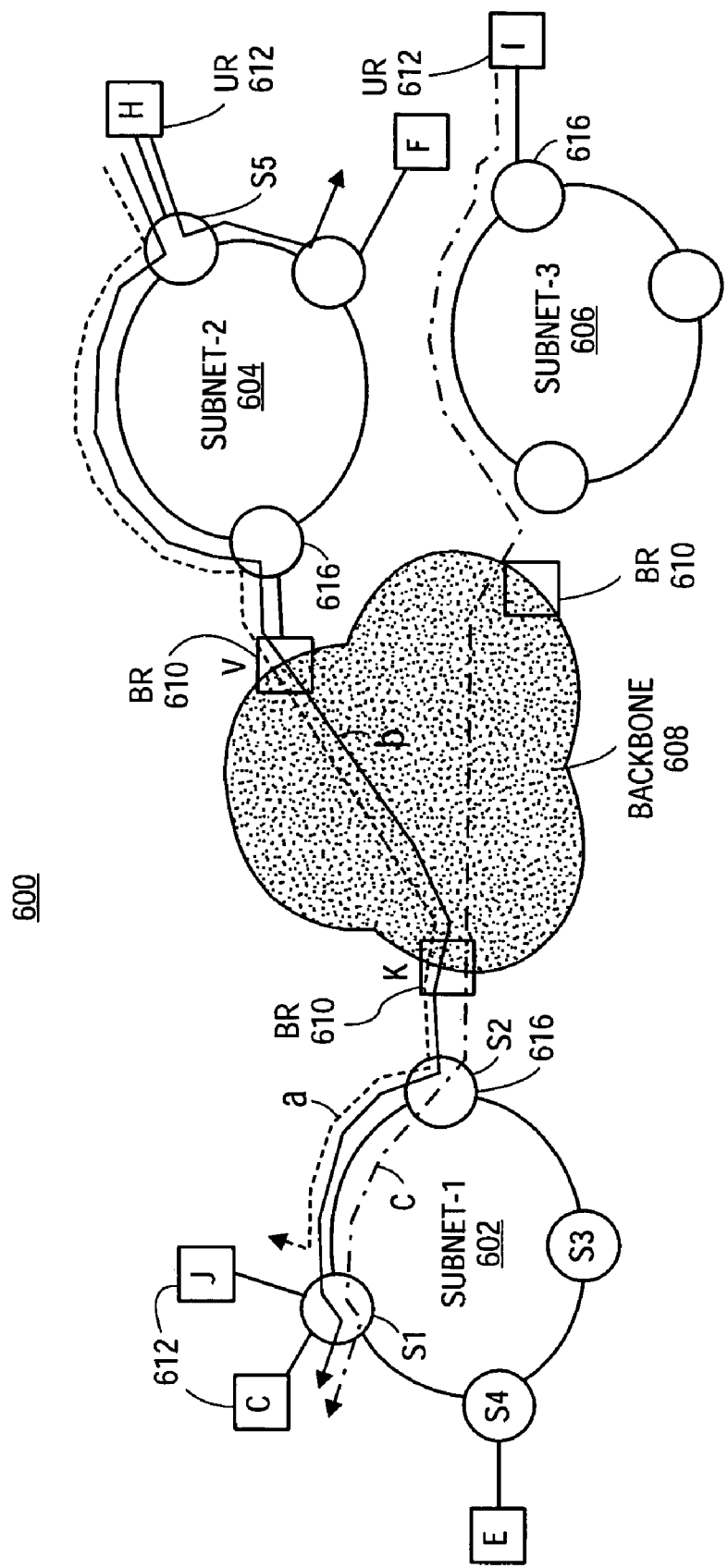
FIG. 6 is a generalized block diagram of a network in accordance with the invention.

Reference is now made to FIG. 6, which shows a network 600 having a plurality of subnetworks ("subnets"), three of which are shown, subnet-1 602, subnet-2 604, and subnet-3 606. Each of the subnets are attached to the backbone 608 of network 600 via a border router (BR) 610, such as V and K. Backbone 608 is composed of multiple links between multiple switches and is simply shown as a "cloud" in FIG. 6 for clarity of illustration. Each subnet is further in communication with various user routers (URs) 612, such as H, I, C, J, E, and F shown in FIG. 6. Each UR 612 and each BR 610 is connected to the respective subnet via various subnet nodes (modified switches) 616, such as those shown at S1–S6 in FIG. 6.

In a modified switch in accordance with the invention, classification can be either localized in one part of the network, e.g., in a subnetwork, or can be end-to-end across subnetworks. FIG. 6 illustrates three data streams that arrive at subnet-1: a, b, and c. If it is desired to only distinguish data streams locally, i.e., distinguish those streams between different nodes in subnet-1, it is not necessary to distinguish streams b and c since they both flow to switch c. But it is necessary to distinguish stream a from b and c. Alternatively, if end-to-end distinction is required, then each of flows a, b, and c must be distinguished since none have both the same source and destination.

The form of classification will depend on which level of distinction is required. As shown in FIG. 5, an IP header 500 includes a source address 508, specifying the host computer from which the packet originates, and a destination address 510, specifying the destination host computer of the packet. In the localized case when only streams between nodes in a subnet is required, the nodes in the subnet classify the packets based on their IP destination address. If classification is end-to-end, then the node will look to both the IP destination address and IP source address to classify the packet.

The objective is to classify streams and offer QoS to streams between a UR and a BR or between URs, which will usually entail identifying the destination address of the designated switch or modified switch. To identify the destination UR from the destination IP address, a modified switch must use a mask or a longest prefix match. Such a match uses the fact that the hosts attached to the same UR have addresses that have one out of a small number of possible prefixes. For instance, these addresses might start with one of three specific 24-bit strings d, e, or g, or a specific 22-bit string h. Addresses attached to another UR would not have a 24-bit prefix d, e, or g nor a 22-bit prefix h. Using this property of the addresses, the modified switch can then search a table that contains the strings d, e, g, h to see if the destination address of a packet shares the prefix d, e, g, or h and determine if it corresponds to that particular UR. A similar mechanism can be used to identify the source UR from the source IP address.

Many subnetworks are also capable of routing packets to virtual LANs (VLANs). Membership to a VLAN is defined administratively independent of the physical network topology. Hence, two computers may each be part of distinct LANs physically, but belong to the same VLAN, making it essentially appear that they are part of the same LAN. When VLANs are used, and if the nodes are VLAN-compatible, packets are typically augmented with a four-byte field called a virtual LAN tag (VLAN tag). The VLAN tag includes a 12-bit VLAN-ID used to identify the VLAN to which the packet is directed. VLAN tags are used generally for routing the packet within a particular subnet. Therefore, in one embodiment, when a modified switch receives an IP packet that has a VLAN tag augmented to the IP packet, the modified switch can route the packet within the subnet in accordance with the VLAN tag instead of with the IP destination address.

As well as source and destination addresses, the IP header also includes an 8-bit "type of service" field 506. The "type of service" field 506 frequently includes bits, which specify a class of service to be provided for the packet. For instance, packets may be classified as e-mail, voice transmission, or web browsing, and then transmitted according to a service specific to the class (e.g., voice transmission generally requires priority transfer over web browsing). In many embodiments, these classification bits are called differentiated services, or DiffServ, bits. Frequently, there are three DiffServ bits, defining up to eight classes of services. Alternatively, different classes of service may be specified in an MPLS label appended to the IP packet. Some embodiments of the invention rely on these type of service fields to further classify packets, as described in METHOD AND SYSTEM FOR IMPLEMENTING END-TO-END QoS IN PACKET-SWITCHED NETWORKS, Ser. No. 09/407,205, filed Sep. 28, 1999, incorporated by reference.

Protection Switching

Figure 7:
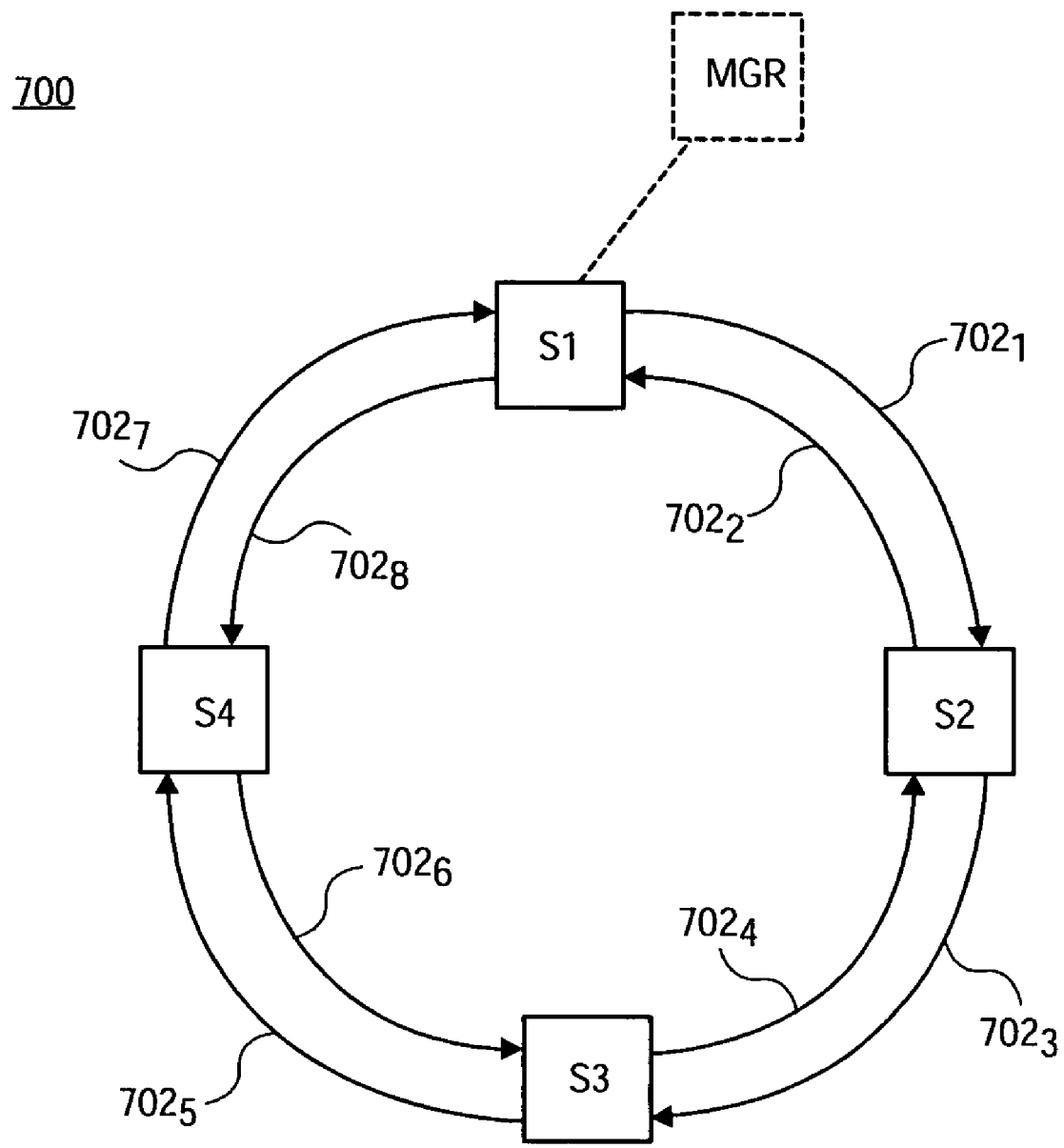
FIG. 7 is a generalized block diagram of a network having a ring topology in accordance with an embodiment of the invention.

In accordance with an embodiment of the invention, a protection switching protocol is included through the control module 414. The protection switching protocol selects the next link on which to transport a packet based on information about faults in the network. Information about faults in the network is stored in a table maintained by a modified switch 400. For instance, referring to FIG. 6, if node S2 receives a packet destined for node E, the normal path for that packet may be designated as the link from node S2 to node S1 and then the node S1 to node S4. A backup path for that packet would likely be designated as the other links around the subnet ring, i.e., the link from node S2 to node S3 and then from node S3 to node S4. A table in each of nodes S1–S4 tracks which nodes and links have failed. Therefore, if there is a failure in node S1 or the links between S2 and S1 or S1 and S4, then when node S2 receives a packet destined for node E, it routes the packet along the backup path, i.e., through node S3. To be effective in a ring topology, the modified switches should have the ability to transmit in both directions, as shown in FIG. 7, for example.

Thus, the table determines for which faults the packet can use its normal path and for which it should use its backup path. The same idea can extend to a mesh network or other networks in various embodiments.

When faults occur, the modified switches first aware of the faults will broadcast signals to other modified switches, advertising the fault occurrences. The protocol also enables the network operator to signal that a link has been repaired.

Scheduling for QoS

Once packets have been classified and queued, then in order to provide QoS the packets should be scheduled. One system and method for scheduling packets to provide for QoS is disclosed in METHOD AND APPARATUS FOR INTERCONNECTION OF PACKET SWITCHES WITH GUARANTEED BANDWIDTH, Ser. No. 09/189,206, filed Nov. 10, 1998, incorporated by reference. The packets are scheduled for transmission by a scheduler 412 and placed in an appropriate output port 406. For purposes of continued discussion, the scheduling methods used in various embodiments are discussed with reference only to a single output port, although it is to be understood that a node in accordance with the invention could have more than one output port.

In one embodiment, Per Flow Queuing (PFQ) is used. PFQ places packets from different connections into different queues that are each served by one or more scheduling algorithms, examples of which are described below. PFQ is typically used in order to implement per flow scheduling.

In some embodiments of the invention, scheduling is performed using TDM, discussed previously. TDM divides the transmission rate of a link into fractions and assigns each fraction to a different queue.

Another scheduling method is weighted fair queuing (WFQ), also known as generalized processor sharing (GPS), known in the art. With WFQ, if there are Z queues with weights W(1), W(2), W(Z) respectively, then as long as a subset of the queues is nonempty, the link serves the queues in proportion to their given weight. The order in which the packets would leave the queue is determined every time a packet is transmitted.

Figure 1:
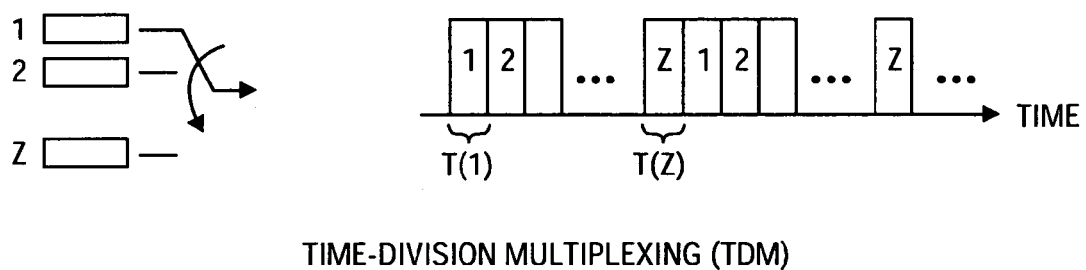
FIG. 1 is a representational block diagram illustrating time division multiplexing.
Figure 2:
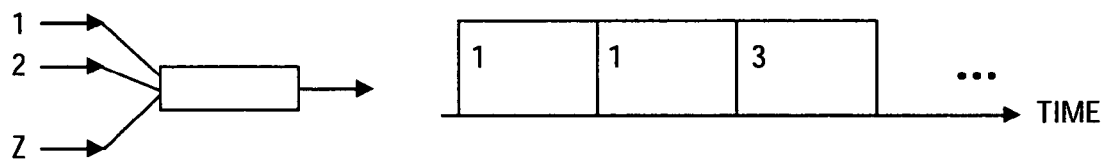
FIG. 2 is a representational block diagram illustrating first-come, first-served statistical multiplexing.
Figure 3:
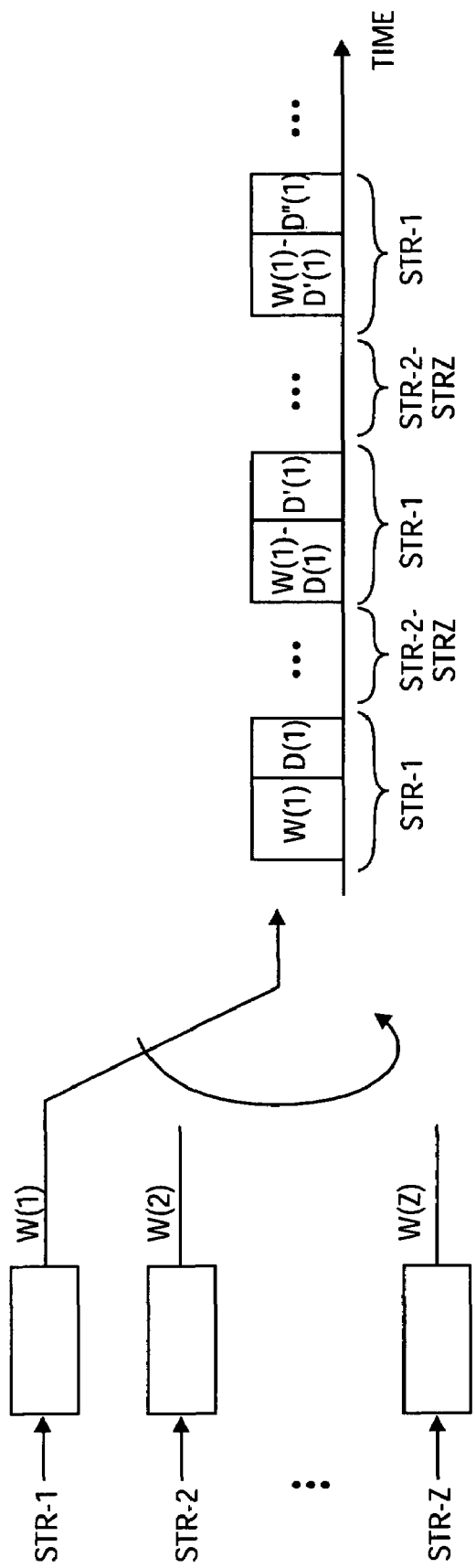
FIG. 3 is a representational block diagram illustrating deficit round robin scheduling.

Still, another scheduler in an embodiment of the invention uses a statistical multiplexing method known as the Deficit Round Robin (DRR), which is illustrated in FIG. 3. Under DRR, to multiplex Z data streams, Z integers W(1), . . . W(Z), are first chosen as a weight (W) for each data stream. Then for the first data stream (STR-1) up to W(1) bits are transmitted. If all of the packets of STR-1 are transmitted before transmitting W(1) bits or if bit W(1) is the last bit of a packet, then a second integer D(1) is set to 0. But if bit W(1) is not the last bit of a packet, then additional bits are sent until the transmission of the packet is completed, and D(1) is set to equal the number of additional bits sent. The procedure is repeated for data streams STR-2, . . . , STR-Z with the corresponding numbers W(2), D(2), . . . W(Z), D(Z). The cycle then repeats starting with STR-1, but W(1) is replaced with W(1)-D(1). Hence, W(1)-D(1) bits are transmitted instead of W(1) (in other words, D(1) represents a "deficit" of STR-1). If there are additional bits remaining in a packet, then those D'(1) additional bits are sent. The procedure is again repeated for STR-2, . . . , STR-Z in a similar manner. When the procedure returns again to STR-1, W(1)-D'(1) will replace W(1).

Therefore, using DRR, a minimum transmission rate for a data stream STR-i (where i=1, . . . , Z) will generally be the fraction $$\frac{W(i)}{[W(1)+W(2)+\ldots+W(Z)]}$$

of the transmission rate for the link. Moreover, if some data streams do not need their guaranteed allocation, then the other connections can utilize the unused resources and will do so automatically. With DRR, the bandwidth for the particular data stream is greater than or equal to the rate (R) of the link times the weight (W) for a particular data stream divided by the sum of weights. In other words, $$\frac{RW(i)}{W(1)+W(2)+\ldots+W(N)} \leq bandwidth.$$

Therefore, using the DRR scheduling method, a minimum quality of service for each queue can be guaranteed.

Some schedulers in some embodiments of the invention will combine priority with WFQ or DRR. For instance, voice-over-IP (VoIP) packets can be served with higher priority than other queues, while those other queues are scheduled with WFQ.

As well, a scheduler in an embodiment of the present invention may use backpressure, a mechanism by which a node can notify an upstream node that the data rate of some data streams should be throttled back. For instance, a modified switch monitors the occupancy of its queues. When the queue of a specific data stream is at or exceeds some high threshold, it is marked as congested. The status is reset to "non-congested" when the occupancy of the queue corresponding to the queue falls below some low threshold. The modified switch notifies the upstream node of that stream that the upstream node should slow down or stop the transmissions of packets of that stream. The scheduler of the upstream node uses the backpressure notification to modify its schedule. For instance, the scheduler may skip a data stream whose queue in the downstream node is congested. The node can resume serving that queue after a fixed delay or can wait until it gets a new message from the downstream node that indicates that the congestion has been eliminated. Thus, backpressure can be combined with PFQ to provide per flow backpressure.

Monitoring

Monitoring is also included in an embodiment of the invention in control module 414. Each modified switch keeps track of the occupancy of the queues of different data streams. This monitoring can be performed even when packets are decomposed into ATM cells by watching for marked cells, as described previously. The modified switch can track queue occupancy and can compute average occupancies, as in RED. Other statistics can also be tracked, such as delays, etc. Statistics can later be collected by a network management system to verify the QoS that the network offers to individual flows.

Provisioning

To guarantee rates to specific data streams, a call admission and provisioning procedure should be utilized. Such a procedure keeps track of the resources already committed to accepted connections and determines if a newly requested connection can be accepted. In addition, this procedure identifies a suitable path for the new connection and the scheduling parameters and rules for the new connection. These configuration parameters are then provided to the nodes. One embodiment of the invention utilizes a provisioning procedure as described in PROVISIONING NETWORKS FOR RELIABLE QUALITY OF SERVICE, Ser. No. 09/365,607, filed on Aug. 2, 1999, incorporated by reference.

In one embodiment of the invention, one node in a network or subnetwork is designated as a "manager" node. The manager node maintains a table whose entries are indexed by a pair (j;f) of link identifiers. The entry A(j;f) of the table represents the transmission rate that the link j may have to carry in the event that link f fails. That is, A(j;f) is the total transmission rate that has been committed to the connections that have been accepted. When a user requests a new connection with rate N in the absence of a failure and a rate B in the event of a failure, the manager node tries to find a path from the source to the destination whose links have a spare capacity of at least N in all possible cases of fault f. In addition, the manager node searches for a backup path whose links have a spare capacity at least equal to B. Once the manager node has selected the normal and backup paths, it updates the entries A(j;f) of its table to reflect the new commitments. If the manager node cannot locate suitable normal and backup paths, it rejects the connection request.

More specifically, such a method for provisioning will be described with respect to a ring topology, such as that shown in network 700 of FIG. 7. FIG. 7 illustrates a ring topology such as those found in the subnetworks of FIG. 6. The network (or subnetwork) 700 includes nodes S1–S4, that are interconnected by pairs of unidirectional links 702. Virtual-type connections are formed between respective pairs of nodes. For instance, in FIG. 7, a connection may be formed between S1 and S3. A second connection may be formed between S2 and S4. And a third connection may be formed between S2 and S3.

For each connection, data travels on a route, or path, from its source node to its destination node via various links. More than one path is often possible for a given connection. For instance, one path for a connection between S1 and S3 may be from S1 to S2, via link $702_1$, and from S2 to S3, via link $702_3$ (clockwise). A second path for the same S1 to S3 connection would be from S1 to S4, via link $702_8$, and from S4 to S3, via link $702_6$ (counter-clockwise).

In accordance with an embodiment of the invention, every connection i in network 700 is given a normal path, $n_i$, and a backup path, $b_i$. For a connection formed between S1 and S3, a normal path may be chosen as the clockwise path through S2 while the backup path would be the counter-clockwise path through S4. Therefore, if there were a failure in link $702_1$, link $702_3$, or node S2, then the connection would use the backup path through S4. Until a failure occurs, however, only the normal path is used to transmit information—not the backup path.

To implement the rerouting of a connection i along its backup path $b_i$ when a failure f occurs along its normal path $n_i$, one or more network nodes detect the failure f and broadcast that fault condition to other nodes. Each node is configured with a table that specifies, for all i and f, whether to reroute a packet of connection i on its backup path depending on the fault condition f. After a fault condition has been repaired, the nodes are informed of this repair and return to using the normal paths.

Each connection is also characterized by two rates, $N_i$ and $B_i$. $N_i$ is the normal rate—the rate for the normal path of connection i that can be guaranteed in the absence of a failure in its normal path. $B_i$ is the backup rate—the rate for backup path $b_i$ that can be guaranteed in the event of a failure in the normal path of connection i (excluding a failure in the node of ingress or the node of egress). $N_i$ and $B_i$ can be the same rate, in the same embodiments, or different rates, but $B_i \leq N_i$.

In accordance with an embodiment of the invention, to efficiently assign paths with sufficient bandwidth and other quality of service guarantees to new connections, the rate already being used on various links by already existing connections must be known. In a network such as that of FIG. 7, that already has a set of connections established for which there are no failures, the rate through a particular link j can be determined by summing $N_i$ of all the connections i whose normal path $n_i$ uses link j. This utilized rate, designated A(j), can be expressed as follows:

$$A(j) = \Sigma_i N_i 1\{j \in n_i\}$$

The notation utilized in the equation above is described as follows: if p is a proposition, then 1{p} is equal to 1 if proposition p is true and is equal to 0 otherwise.

Figure 8:
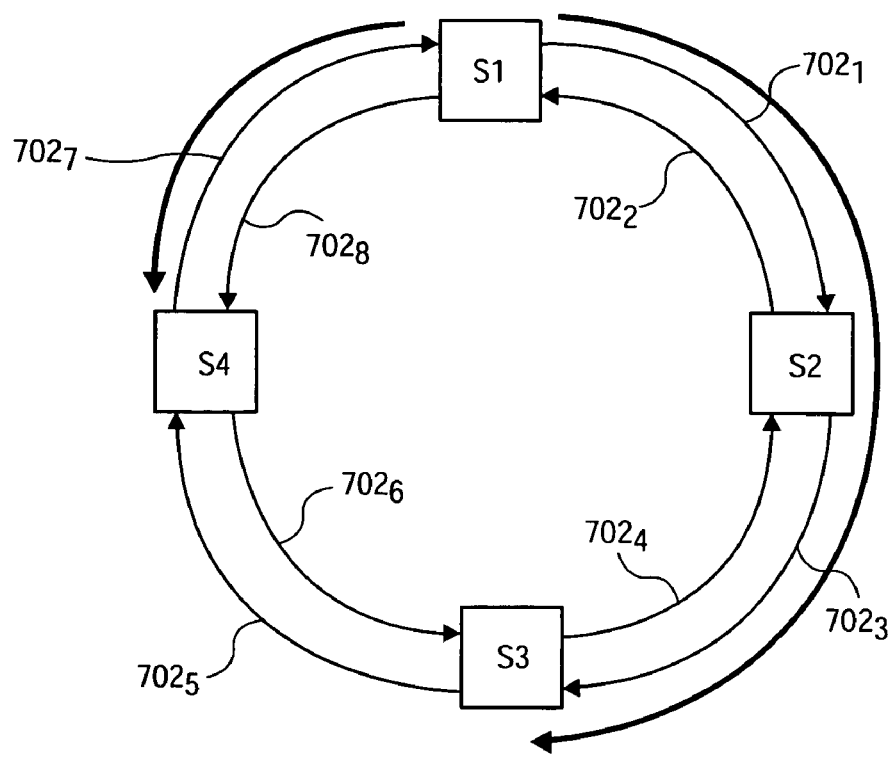
FIGS. 8 and 9 illustrate the paths of various connections formed using the network illustrated in FIG. 7.
Figure 9:
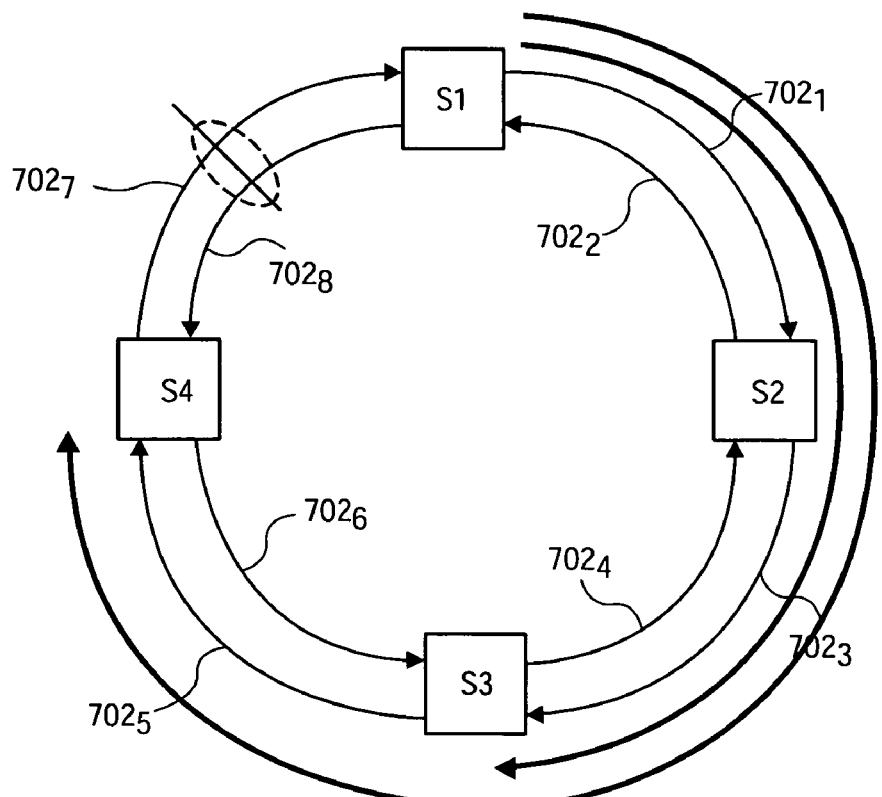

A failure f can be a failure with one of the links, one of the nodes, or any other failure obstructing the normal path. In the event of a failure f in the network 700, then every connection i whose normal path $n_i$ uses f must be rerouted along its backup path $b_i$. For instance, as shown in FIG. 8, a first connection is formed from node S1 to node S3 having a clockwise normal path through node S2 and links $702_1$ and $702_3$. A second connection is formed from node S1 to node S4, having a counter-clockwise normal path via link $702_8$. In the event of a failure f on link $702_8$, the connection between S1 and S4 will have to be rerouted along its backup path: clockwise through nodes S2 and S3 and links $702_1$, $702_3$, and $702_5$. Hence, as shown in FIG. 9, link $702_1$, for example, will carry all of its normal traffic from the S1–S3 connection as well as rerouted traffic from the S1–S4 connection.

In accordance with an embodiment of the invention, in order to accommodate a failure, the rate each link j must carry in the event of a failure must be determined to account for rerouting. The rate A(j;f) that a link j must carry in the event of a failure f is determined by summing the rate $N_i$ of all the connections i whose normal path $n_i$ uses link j (but not element f), summing the rate $B_i$ of all connections i whose normal path $n_i$ uses f and whose backup path $b_i$ uses link j (but not element f), and then adding the two sums. In other words, $$A(j;f) = \Sigma_i N_i 1\{j \in n_i \text{ and } f \in n_i\} + \Sigma_i B_i 1\{j \in b_i \text{ and } f \in b_i \text{ and } f \in n_i\}.$$

As will be understood by those of skill in the art, if the failure occurs with the ingress (source) or egress (destination) node of connection i, then the connection i cannot be rerouted.

In accordance with an embodiment of the invention, new connections are accepted only when the links that form its normal and backup paths can accommodate the additional rate demands. In other words, for a new connection to be accepted, $$A(j) < R_j \text{ and } A(j;f) < R_j \text{ for all j and f,}$$

even after adding the new connection. In the above equation, $R_j$ designates the transmission rate of link j.

Figure 10:
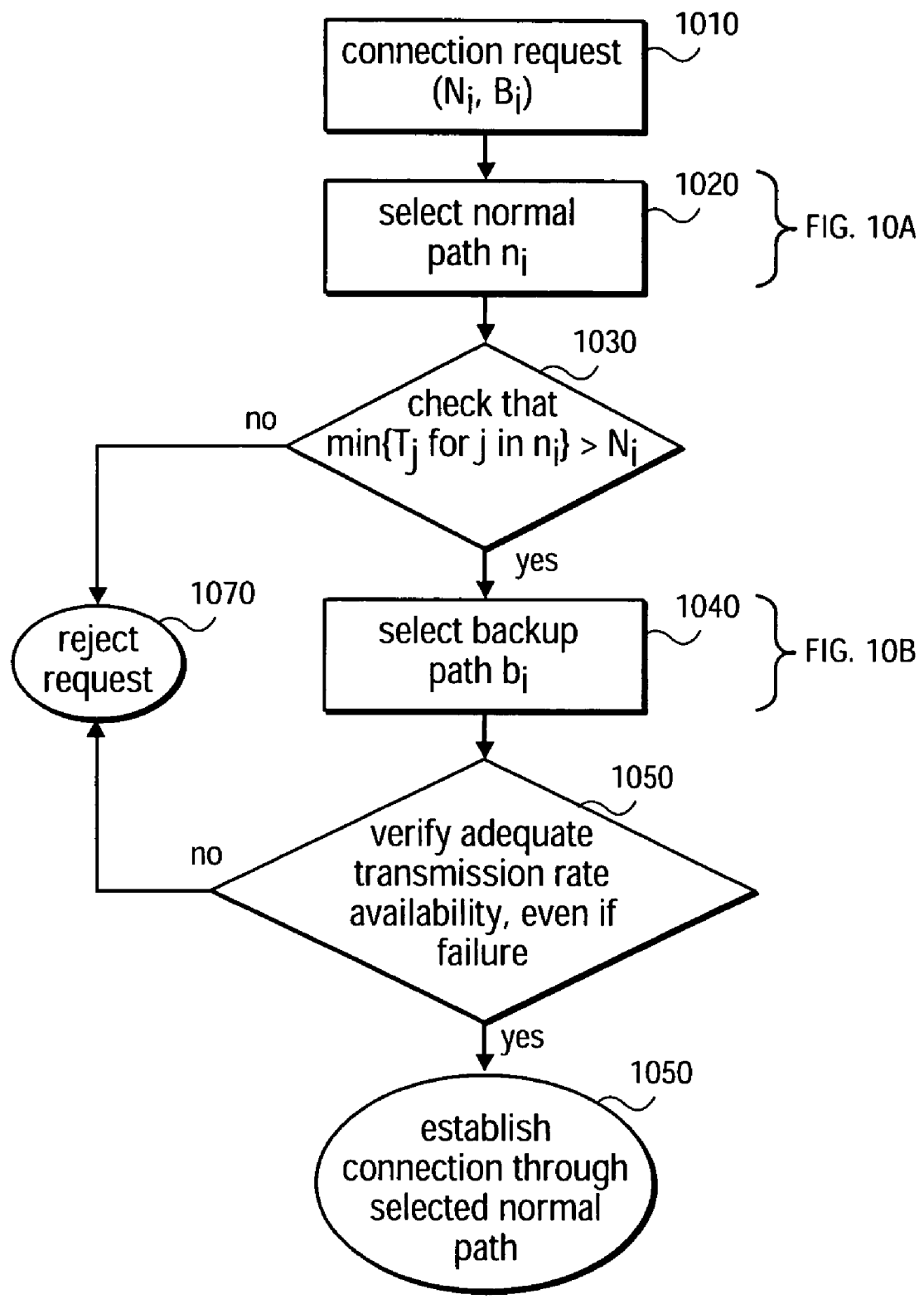
FIGS. 10, 10a, and 10b are flow diagrams illustrating some of the steps taken in accordance with an embodiment of the invention.

When a new connection is requested, a normal path and a backup path must be selected, the links of each path containing enough spare transmission to accommodate reroutes in the event of a failure. Referring to FIG. 10, when a new connection is requested, step 1010, a potential normal path $n_i$ is selected, step 1020. As will be understood, the normal rate $N_i$ may be designated in some embodiments by the connection request itself. In other embodiments, the normal rate may be designated by other means. For instance, all connections could be predesignated to have a particular rate.

Figure 10A:
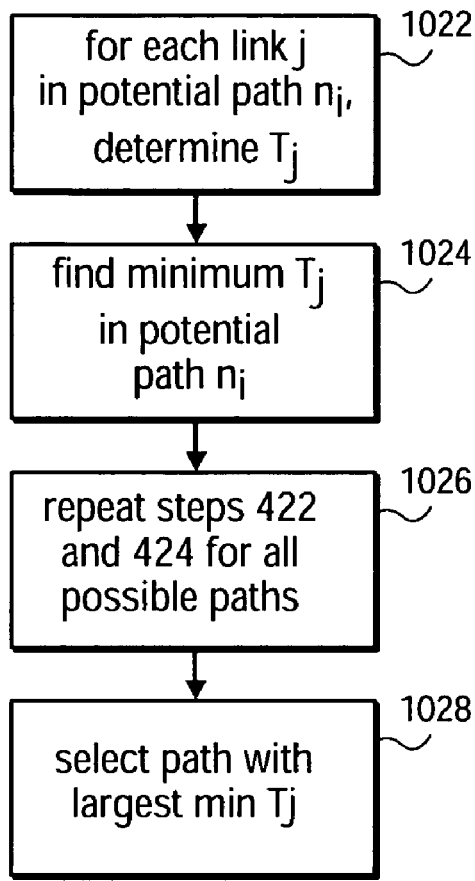

More specifically, in one embodiment of the invention, one method for choosing the normal path for a connection is to choose the path with the largest amount of spare transmission rate. Step 1020 is divided into several substeps as shown in FIG. 10a. First, step 1022, for each link j in a potential path $n_i$, the spare transmission rate, $T_j$, is determined, where $$T_j = R_j - \max\{A(j); A(j;f) \text{ for all potential } f\}.$$

Once $T_j$ for each link in a potential path is determined, then the minimum $T_j$ is taken, step 1024, as representative of the spare transmission rate available on the potential path. In step 1026, steps 1022 and 1024 are repeated for all potential paths $n_i$. Then in step 1028, the minimum spare transmission rate, $T_j$, for each potential path is compared, and the path with the largest spare transmission rate is selected for the normal path of the new connection. Other embodiments of the invention may simply choose a path that can accommodate the rate demands, without regard to which path has the most spare bandwidth available.

In the above discussions, it is assumed that there is only one failure f at a time. Nonetheless, one of ordinary skill in the art should be able to easily adapt the principles discussed herein in the event of more than one failure.

Referring again to FIG. 10, once the normal path is selected, it must be verified that the transmission rate added by the new connection will not exceed link capacities, even in the event of a failure on a link not on the normal path, step 1030. That is, it must be verified that the minimum available bandwidth in the selected normal path is larger than $N_i$. If that condition is not satisfied, then the request for the new connection i is rejected, step 1070. If the condition is satisfied, then the backup path $b_i$ is selected in step 1040.

Figure 10B:
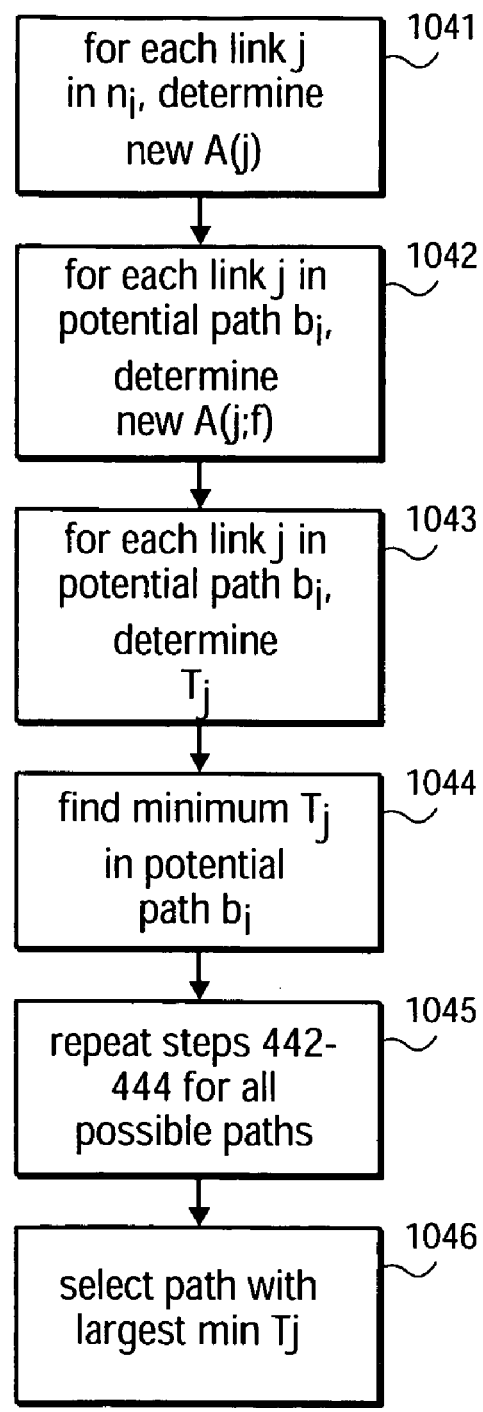

Backup path selection, step 1040, is also divided into substeps shown in FIG. 10b. For each link j in the newly selected normal path $n_i$, an updated A(j) is determined, step 1041, by adding the new rate $N_i$ to that already carried by the link for pre-existing connections as follows:

$$A(j) := A(j) + N_i 1\{j \in n_i\}.$$

In step 1042, for a potential backup path $b_i$, the rate A(j;f) on each link j in case of a failure f is determined:

$$A(j;f) := A(j;f) + N_i 1\{j \in n_i \text{ and } f \in n_i\} + B_i 1\{j \in b_i \text{ and } f \in b_i \text{ and } f \in n_i\}.$$

In step 1043, the available bandwidth $T_j$ on each link j of the backup path $b_i$ is then determined:

$$T_j = R_j - \max\{A(j), A(j;f)\}.$$

Once $T_j$ for each link in the potential path is determined, then the minimum $T_j$ is taken, in step 1044, as representative of the spare transmission rate available on the potential path. In step 1045, steps 1042–1044 are repeated for all potential paths $b_i$. Finally, in step 1046, the potential backup path with the largest minimum value of $T_j$ is selected.

Referring again to FIG. 10, the selected backup path $b_i$ is acceptable if its minimum value of $T_j$ is non-negative, as determined in step 1050. If the minimum $T_j$ is negative, then the connection is rejected, in step 1070. Finally, adequate transmission rate is determined, then a connection can be established, step 1060.

Although the above steps in FIG. 10 are described as being performed in a specified order, it is to be understood that the order of many of these steps can be altered and some can be performed simultaneously. For instance, one embodiment of the invention simultaneously selects a potential normal path and a potential backup path, and then proceeds to verify available bandwidth. Moreover, the particular embodiment of the invention described above is suitable when the number of potential normal paths and backup paths is small (e.g., in a ring network). But if there are many potential paths, then other embodiments may be preferred that can be easily devised by those of skill in the art based on dynamic programming.

As mentioned previously, in one embodiment of the invention, the steps for the connection admission procedure described with respect to FIG. 10, as well as the general maintenance of the quantities A(j) and A(j;f) is performed by a manager node. In one embodiment, such a manager node may be on the ring shown in FIG. 7, e.g., master node may be S1. In another embodiment, the master node may be off-ring, but in communication with the network, e.g., manager node MGR may be coupled to node S1 as shown in phantom in FIG. 7. In other embodiments, the responsibilities for the connection admission procedure and maintenance of the quantities A(j) and A(j;f) may be shared among several nodes.

Although the above method is described assuming that a maximum rate $R_j$ can be carried on each link, nonetheless, in some embodiments of the invention, overbooking of a particular link may be possible because not all flows transmit at their peak rate all the time. For instance, if $A(j)<R_j$ and $A(j;f)<R_j$ hold true with a probability close to one for the rates averaged over a short time interval, these average rates will typically be significantly smaller than the guaranteed rates. Overbooking can be captured by replacing every link rate $R_j$ by some multiple (larger than 1) of $R_j$. For instance, if measurements reveal that the actual rates used on the links are only 50% of the reserved rates, then the network operator may replace $R_j$ with $2R_j$, basing calculations on the assumption that the average connection rates are half as large as their guaranteed rate.

An embodiment of the invention has been described with respect to a ring topology for convenience of illustration only. A system and method in accordance with the invention is easily extended to other topologies, such as a ring-tree topology or a general mesh topology.

Figure 11:
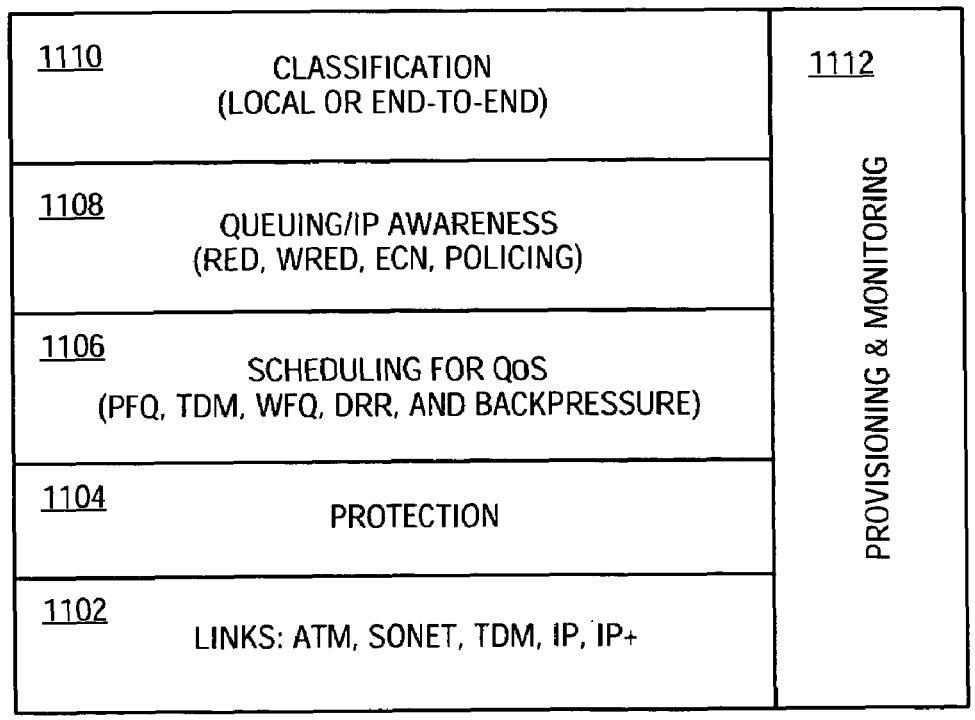
FIG. 11 is a block diagram illustrating the various protocol layers in a switch in accordance with the present invention.

A summary of an embodiment of the present invention is given with respect to FIG. 11. The figure illustrates a modified-switch-protocol architecture in accordance with an embodiment of the invention. Starting at the bottom, the data link layer 1102 may include any conventional protocol whether or not it was designed to support Ethernet or IP (or other protocol), including ATM, SONET, WDM, IP, or IP+ (an extension of IP that might include DiffServ or MPLS, as will be understood in the art). The data link layer implements some form of framing. The protection layer 1104 selects the next appropriate link for packet transmission based on information about faults in the network. The scheduling layer 1106 controls the QoS by appropriately allocating link bandwidth to the queues. The queuing layer 1108 determines if packets are TCP or UDP, and determines which packets to drop or mark using policing, RED, WRED, ECN, or another drop determination mechanism. The classification layer 1110 determines how different packets should be handled and determines which queues the packets belong. Finally, in the control plane 1112 shown to the right of the stack, provisioning and monitoring functions are implemented as described above.

These layers relate to the modified switch shown in FIG. 4 as follows. The functions of link layer 1102 are implemented in the conventional switch 402. The functions of protection layer 1104 are implemented in control module 414. The functions of scheduling layer 1106 are carried out in scheduler 412. The functions of queuing layer 1108 are carried out by queuing module 410 in conjunction with control module 414. The functions of classification module are carried out by classifier 408. And the functions of control plane 1112 are carried out by control module 414. Each of these functions can be carried out with hardware, software, firmware, or a combination thereof.

As will be understood by those in the art with reference to FIGS. 4 and 11, each of these layers can be added to existing network switches (402) with minimal additions to the switches and improve their performance with respect to IP or Ethernet (or other protocol) packets.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A switch comprising:
   a classification module to classify packets according to information contained in a header of a packet;
   a packet identifier coupled to the classification module to identify packets formatted in accordance with an Ethernet Protocol and to further determine whether to send or discard each packet;
   a switching fabric coupled to the packet identifier to operate in accordance with a Wavelength Division Multiplexing (WDM) protocol and to place packets into an appropriate queue based at least in part on each packet's classification;
   a scheduling module coupled to the switching fabric to schedule the packets for transmission and to provide Quality of Service (QoS) to the packets; and
   a control module coupled to the classification module, the packet identifier, and the scheduling module to control the functions of each module and to select a next appropriate link for packet transmission based on information about faults in the network.

2. A method for identifying Internet Protocol (IP) packets in a switch designed for use with an Asynchronous Transfer Mode (ATM) protocol comprising:
   identifying an IP packet by reading a bit in an ATM header of an ATM cell;
   detecting an IP header of the IP packet in a next ATM cell;
   determining whether the IP packet is a user data protocol (UDP) packet or a transmission control protocol (TCP) packet;
   determining whether to drop or transmit the IP packet based on whether the IP packet is a UDP or TCP packet by tracking the number of packets that arrive at the switch, and dropping a TCP packet based on the tracked number;
   classifying the IP packet into one of a plurality of quality of service (QoS) classes to provide an appropriate level of QOS; and
   forwarding the IP packet in accordance with the appropriate level of QoS.

3. The method of claim 2, further comprising dropping ATM cells that contain a part of the IP packet if the IP packet has been determined to be dropped.

4. The method of claim 2, wherein determining whether the IP packet should be dropped further comprises determining whether a buffer of the switch is full and dropping a UDP packet if the buffer is full.

5. An apparatus comprising:
   a network interface to receive a plurality of packets from a network;
   a processor and logic executable thereon to provide a protocol architecture for processing the received packets, the protocol architecture including
   a queuing layer to identify packets formatted in accordance with an Internet Protocol (IP) and to determine whether to transmit or drop each packet;
   a classification layer to classify the identified packets for Quality of Service (QoS) and to determine to which of a plurality of queues the packets belong;
   a scheduling layer to allocate link bandwidth to the plurality of queues;
   a protection layer to select the next appropriate link for packet transmission based on information about faults in the network; and
   a control plane to perform provisioning and to monitor each layer.

* * * * *